United States Patent [19]

Gross

[11] 4,270,239
[45] Jun. 2, 1981

[54] INTERLOCK SUPPORT STRUCTURE

[75] Inventor: Meyer A. Gross, New York, N.Y.

[73] Assignee: New York Toy Corporation, New York, N.Y.

[21] Appl. No.: 64,658

[22] Filed: Aug. 8, 1979

[51] Int. Cl.³ .............................................. A47B 95/02
[52] U.S. Cl. ...................................... 16/112; 280/655; 403/100
[58] Field of Search ................... 403/100, 102; 16/115, 16/113, 111 R, 112; 280/47.37 R, 47.17, 647, 649, 655, 658

[56] References Cited

U.S. PATENT DOCUMENTS

| 1,188,330 | 6/1916 | Schaefer . | |
|---|---|---|---|
| 1,407,040 | 2/1922 | Myers . | |
| 1,498,312 | 6/1924 | Whitehead . | |
| 1,785,342 | 12/1930 | Gilbert | 403/100 |
| 1,890,469 | 12/1932 | Powers . | |
| 2,120,425 | 6/1938 | Frey . | |
| 2,291,250 | 7/1942 | Nielsen et al. | 280/47.37 R |
| 2,294,967 | 9/1942 | Eberhardt . | |
| 2,467,579 | 4/1949 | Boudreau | 403/100 |
| 2,676,027 | 4/1954 | Loustein . | |
| 3,563,592 | 2/1971 | Preston | 403/102 X |

Primary Examiner—Andrew V. Kundrat
Attorney, Agent, or Firm—Wolder, Gross & Yavner

[57] ABSTRACT

A baby carriage handle support, including rotatable arms which fix the handle in upright position when the arms are aligned, uses an interlock which slides along the first arm until the second arm is inserted to the interlock support structure. The interlock support structure includes not only the usual end stop for the second arm, but also a channel projection at right angles to the stop which inserts to the channel of the second arm to provide a more positive locking relationship for the alignment of the two arms.

3 Claims, 4 Drawing Figures

INTERLOCK SUPPORT STRUCTURE

This invention relates primarily to interlock support structures and more particularly to such structures for use in aligning and locking channel members.

A typical baby or doll carriage construction includes not only the body and wheel portion, but also usually a collapsible handle, wherein first and second arms are rotatably attached to each other, such as by a rivet. An angular relationship of such arms provides a collapsed position for the carriage. An alignment of the arms supports the handle in the upright position. A structure is usually provided for locking the arms in aligned position to prevent accidental collapse of the handle which is positioned over the baby's feet. The locking structure commonly comprises a rectangular, flanged locking channel, which slides freely along the first arm and which includes an end stop member. When the second arm is aligned with the first, the locking channel slides along the first arm until the second arm is received within the locking channel with its end abutting the stop member.

The above structure has proven to be inadequate in one major respect; i.e., there is enough lack of positive locking relationship between the locking channel and the two arms such that the channel often is removed from the second arm by the slightest touch thus collapsing the handle. Also, wobbling and shear forces result from such a structure.

Accordingly, a primary object of the present invention is to provide an interlock support structure of the type useful for a baby carriage handle which provides a positive locking relationship between the rotatable arms of the handle and the locking channel which holds such arms in aligned relationship.

Another object of the present invention is to provide an interlock support structure of the type described which is easy to operate and yet performs its intended function in a reliable and efficient manner, and which presents a relatively simple design for the intended purpose, without as much wobbling and shear force.

These and other objects of the present invention are provided in an interlock support structure which features a generally rectangular, flanged, locking channel, with a stop member at the end thereof. Perpendicular to the stop member, and spaced from the base of the channel member, is a channel projection. Since each arm of the handle support is usually of channel structure, the rotatable arms, when aligned, can be positively locked by sliding the channel member along the first arm, so that the second arm is received within the channel member with its end abutting the stop member and with the channel projection inserted with the channel of the second arm. By properly dimensioning the channel and its channel projection, a tight fit between the channel member, the first arm and the second arm efficiently locks the handle in upright position.

Other objects, features and advantages of the present invention will become apparent by reference to the following more detailed description of a preferred, but nonetheless illustrative, embodiment, taken in conjunction with the accompanying drawings wherein.

Figure 1:
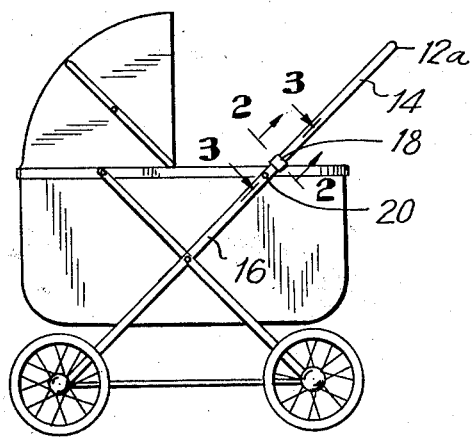
FIG. 1 is a side view representation of a baby carriage, particularly showing the handle in upright position with its support arms in aligned relationship and held in that relationship by a locking channel according to the present invention.
Figure 3:
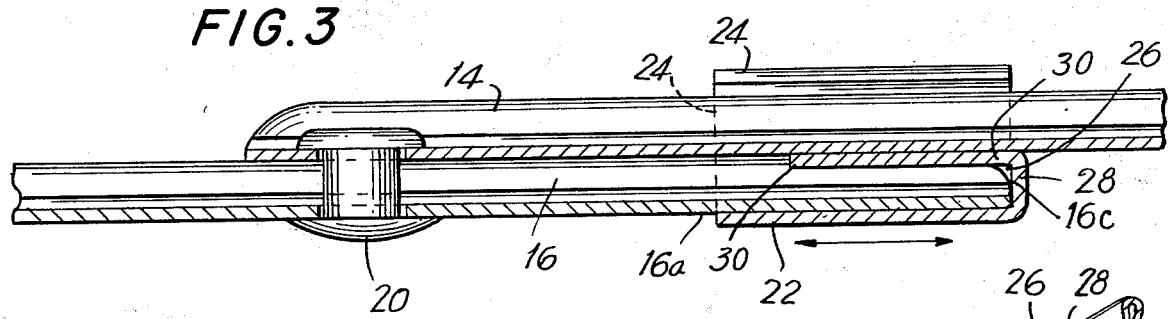
Figure 4:
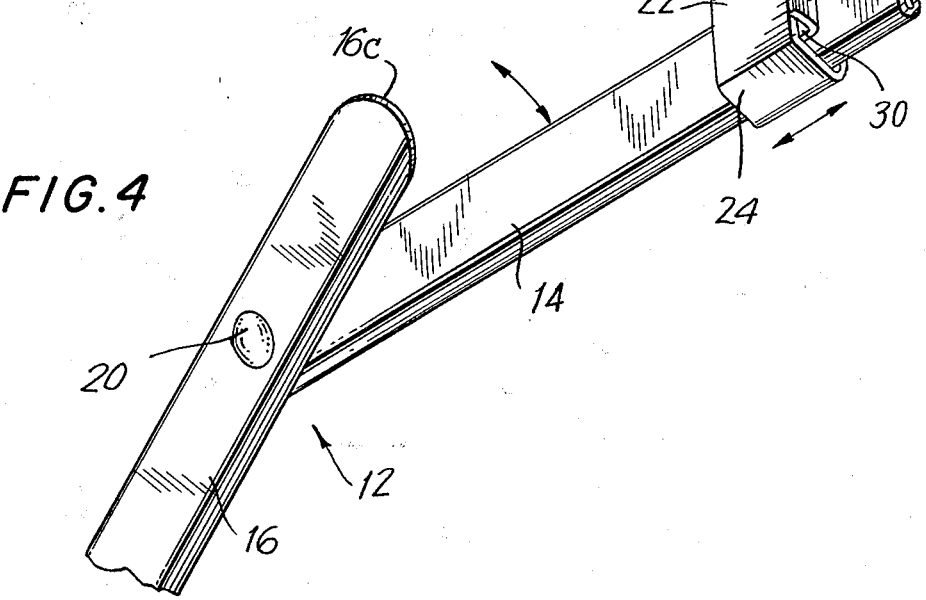

FIG. 3 is a sectional view taken along the line 3—3 of FIG. 1 and showing particularly the insertion of the channel projection to the channel of the second arm in order to provide positive locking for the upright position of the handle; and FIG. 4 is an isometric representation of the support arms of the handle for collapsed position thereof with the locking channel in free slidable relationship with the first arm.

Referring to the drawings, FIG. 1 illustrates the carriage with a collapsible handle 12 thereon. Such a structure is useful particularly in protecting the baby by the upright position of the handle during use and for collapsing the handle to store the carriage during non-use. The handle 12 includes first and second arms 14, 16, which are aligned for holding handle 12 in upright position.

A substantially rectangular locking channel, generally designated 18 is used to hold and lock the arms 14, 16 in aligned position.

Figure 2:
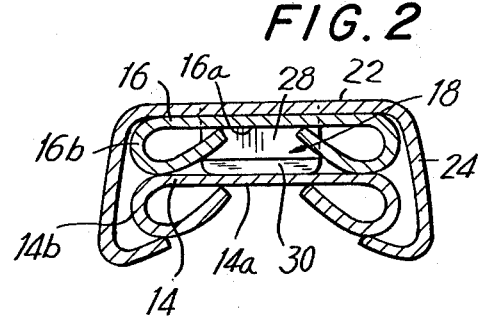
FIG. 2 is a sectional view taken along the line 2—2 of FIG. 1 and showing particularly the second arm inserted to the locking channel with the channel projection of the locking channel inserted to the channel of the second arm, thereby providing a positive locking relationship.

More particularly, first and second arms 14, 16 are rotatably connected by a rivet 20, or the like, and are usually in the form of channel members, wherein each defines a channel 14a, 16a (FIG. 2) by means of enlarged side portions 14b, 16b.

Locking channel 18 is constructed with a base 22 and side flanges 24 defining an inner opening 26 (FIG. 3) for insertion of second arm 16. At the end of opening 26 is a stop member 28 at right angles to a channel projection 30. Opening 26 is dimensioned by means of the distance between base 22 and channel projection 30, such that second arm 16 fits into the opening 26 with channel projection 30 fitting tightly into channel 16a of second arm 16.

In order to provide a more complete description of the present invention, a series of operational steps will now be described. Assuming that the initial position of handle 12 is the collapsed position, wherein arms are arranged in an angular relationship to each other (FIG. 4), motion of the handle to the upright position is accomplished by lifting the front edge 12a of handle 12 until arms 14, 16 are in aligned relationship. Locking channel 18 is then moved so that the end 16c of second arm 16 abuts stop member 28 inside of the locking channel 18. Upon motion to this position, channel projection 30 will insert to channel 16a of the second arm in a closely fitting relationship such that some removal pressure will be required to move locking channel 18 along first arm 14 for removal of second arm 16 from the locking channel. When such removal is accomplished, the handle can be easily collapsed.

Of course, the structure of the present invention is also useful in either a baby carriage as described, or in a stroller or doll carriage. Furthermore, it is useful in connection with a collapsing canopy, as well as a collapsing handle.

The foregoing description provides an example of the construction and use of the present invention, which is to be limited in its scope only by the following claims:

What is claimed is:

1. An interlock support structure for aligning first and second, substantially flat, elongated channel members and locking said members in aligned relationship comprising a locking channel having a base in a plane generally parallel to the plane of said members, side flanges extending from said base defining therebetween a locking channel opening, a stop member substantially perpendicular to said base and terminating one end of said opening and a channel projection member generally parallel to and overlying said base and generally perpendicular to said stop member, all constructed and arranged such that said second member inserts into said opening with one of its ends abutting said stop member and said locking channel being slidable with respect to said first member, and said channel projection member received within the channel of said second channel member thereby improving the locking relationship and alignment of said channel members.

2. The invention according to claim 1 wherein said slidable relationship of said locking channel and said first member is enabled by said locking channel flanges partially encircling said first member.

3. The invention according to claim 1 wherein said support structure further includes said members affixed to a carriage handle wherein the aligned relationship of said members supports said handle in an upright position and an angular relationship of said members enables collapse of said handle.

* * * * *